W. H. KELLY.
ATTACHMENT FOR MOTION PICTURE PROJECTING MACHINES.
APPLICATION FILED JULY 3, 1917.
1,273,070.
Patented July 16, 1918.
2 SHEETS—SHEET 2.
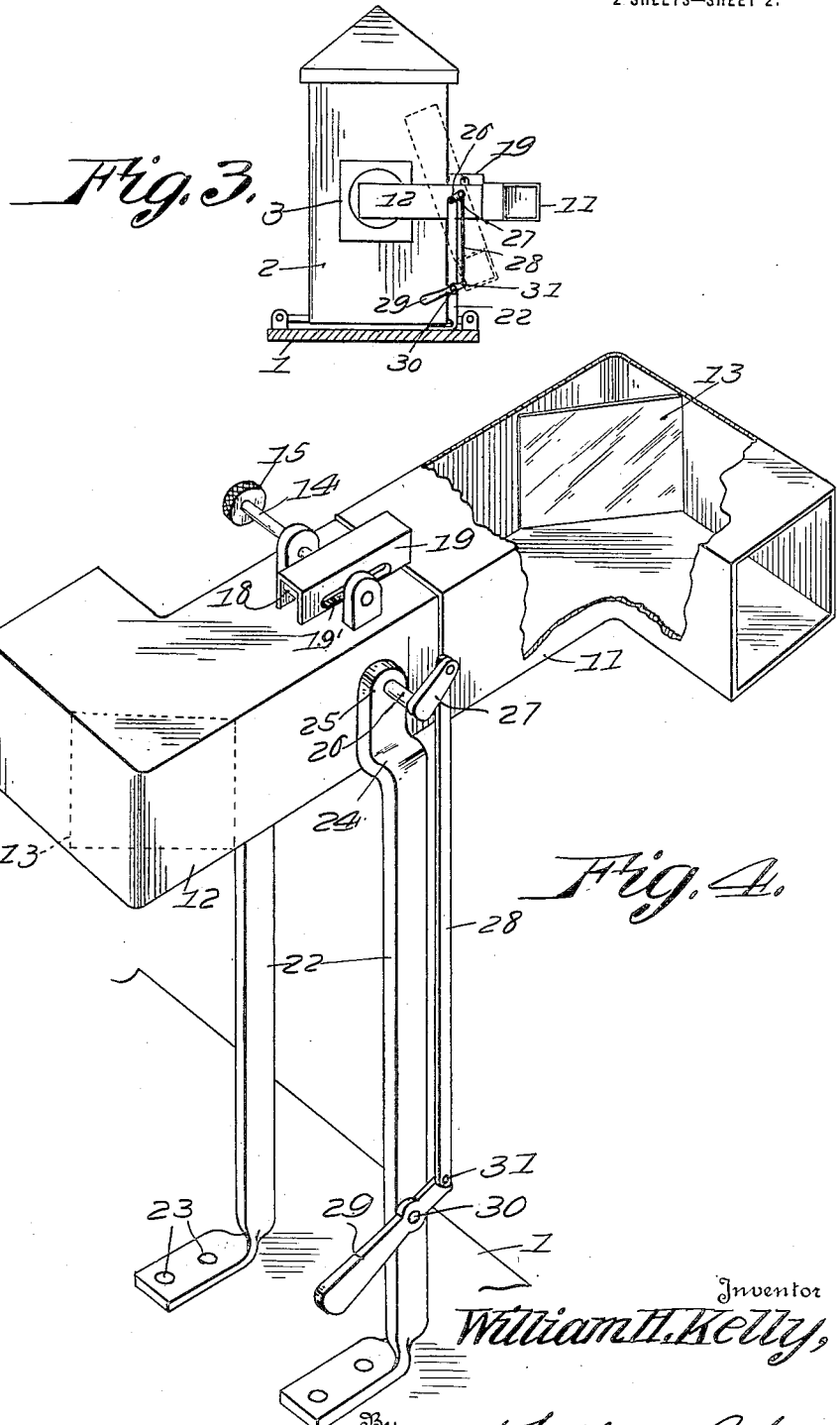

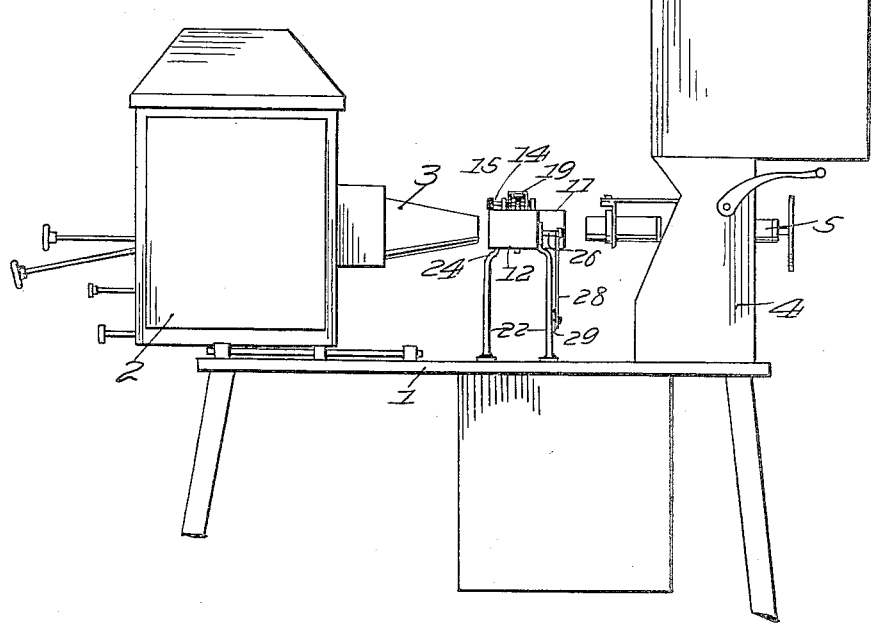
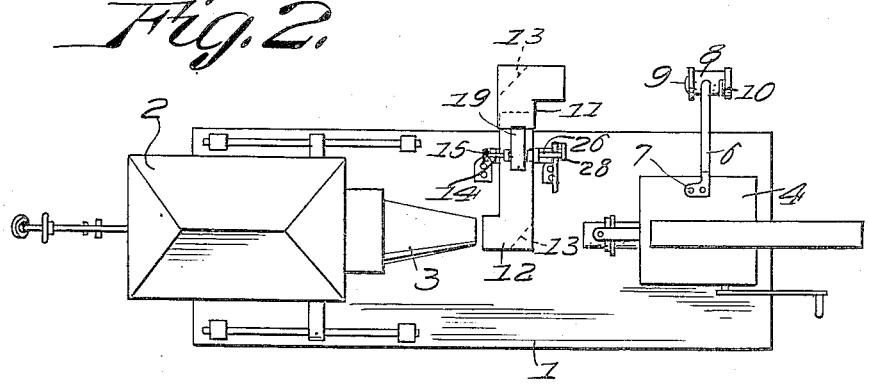
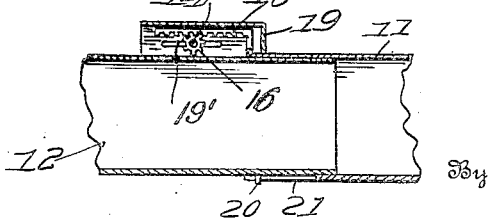

UNITED STATES PATENT OFFICE.

WILLIAM H. KELLY, OF SPARKS, NEVADA.

ATTACHMENT FOR MOTION-PICTURE-PROJECTING MACHINES.

1,273,070.  Specification of Letters Patent.  Patented July 16, 1918.

Application filed July 3, 1917. Serial No. 178,374.

*To all whom it may concern:*

Be it known that I, WILLIAM H. KELLY, a citizen of the United States, residing at Sparks, in the county of Washoe and State of Nevada, have invented certain useful Improvements in Attachments for Motion-Picture-Projecting Machines, of which the following is a specification, reference being had therein to the accompanying drawing.

The present invention has reference generally to improvements in motion picture projecting machines and more particularly relates to a light reflecting attachment for motion picture projecting machines.

As the primary aim and object, the present invention contemplates the provision of improved means for supporting an auxiliary objective lens with which coöperate the novel light reflecting means whereby a light from the lamphouse may be reflected to the auxiliary objective lens to enable the operator of the machine to display advertising slides, the light reflecting means incidentally being manually adjustable so that when desired the light rays from the lamphouse may be projected through the main objective lens for showing moving pictures.

More particularly, the present invention resides in the provision of a novel light reflecting tube movably mounted with respect to the supporting table board so that it may be swung into either a horizontal operative position or a vertical inactive position.

It is an additional and equally important object of this invention to construct the light reflecting tube in sections and to provide novel manually operable means for adjusting these sections relative to each other.

More specific objects of the invention embraces the provision of improved manually operable means for swinging the light reflecting tube; and to provide improved means for supporting the auxiliary objective lens, and construct such means so as to removably receive the slides.

Among the other aims and objects of this invention may be recited the provision of a device of the character mentioned with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention, should be considered in connection with the accompanying drawings forming a part hereof, wherein is disclosed for the purpose of illustration a convenient and satisfactory embodiment of the invention. It is to be noted in this connection that minor changes in the construction and arrangement of parts may be made without departing from the spirit of the invention or the principle of operation of the various parts.

The invention is clearly illustrated in the accompanying drawings, in which—

Figure 1 is a side elevation showing the attachment in position in a motion picture projecting machine.

Fig. 2 is a top plan view thereof.

Fig. 3 is an end elevation looking toward the light reflecting tube, the dotted lines being indicative of the position assumed by the attachment when it is desired to show moving pictures;

Fig. 4 is a perspective detail of the light reflecting means; and

Fig. 5 is a sectional detail of the adjusting means for the sections of the light reflecting tube.

Similar characters of reference are employed in all of the above described views, to indicate corresponding parts.

Referring now, more particularly, to the accompanying drawings there is provided a supporting table board 1 upon the rear end of which is adjustably mounted a lamphouse 2 of a conventional construction, while the light condensing tube 3 projects from one face thereof. Mounted upon the front end of the board 1 is a casing 4 for receiving the film actuating mechanism and for supporting the casing of the main objective lens 5.

With a view toward providing improved auxiliary light objective means a bracket 6 has its inner end rigidly connected to the casing 4 by means of suitable fastening devices 7 and extends laterally therefrom. The casing 8 is supported on the outer end of the brackets 6 and supports an auxiliary objective lens 9 being incidentally provided adjacent its opposite end with a slot 10 for removably receiving slides containing advertising matter and the like.

As intimated, improved means have been provided for reflecting the light from the lamp box through the auxiliary objective lens. In reducing this feature of the invention to practice there is employed a light reflecting tube consisting of two sections 11 and 12 of an elbow or L-shaped configuration, being square in cross section, the inner end of the section 12 being telescopically received within the inner end of the section 11. Reflecting plates such as mirrors 13 are disposed diagonally within each of the sections 11 and 12 at the outer corners thereof for a purpose that will presently appear. Suitable means have been provided for adjustably connecting the sections 11 and 12 to each other in the present instance consisting of a rotatably mounted stem 14 in one end of which is carried a knurled operating wheel 15 while a pinion 16 is mounted on the inner end of the stem and engages the teeth of a rack bar 18 carried by the upper surface of the section 11. A casing 19 surrounds the pinion, being carried by the upper surface of the section 11 and provided with opposed longitudinal slots 19' in the sides thereof and in which operates the stem 14. The ends of the slots serve to limit the movement of the stem and consequently regulates relative sliding movement of the sections. Coöperating with the adjusting means in guiding the sliding movement of the sections relative to each other is a pin 20 on the under surface of the section 12 and which operates in a longitudinal slot 21 in the under surface of the section 11.

For the purpose of swingingly supporting the light conducting tube on the table board so that the tube may be swung to either a horizontal or vertical position, a pair of standards 22 are mounted in spaced relation on one edge of the table board 1 through the medium of suitable fastening devices 23. The upper ends of the standards are offset inwardly as indicated by the numeral 24 while the upper ends are provided with bearing openings 25 in which are journaled opposed trunnions 26 which project from opposite sides of the inner end of the section 12. An arm 27 extends at right angles from the longitudinal axis of one of the trunnions while a connecting rod 28 has one end pivotally connected to the outer end of the arm 27. A manually operable lever 29 is pivoted by means of a suitable pivot pin 30 to one of the standards 22 and has the opposite end pivotally connected as indicated by the numeral 31 to the opposite end of the connecting rod.

The mode of operation of the present invention may be reviewed as follows:

It will be appreciated that when the handle end of the lever 29 is pulled upwardly the tube will be swung into a vertical position and when the lever of course is pushed in an opposite direction the tube will be swung to asume a horizontal position as indicated in Fig. 4 of the drawings. Of course when in a horizontal position the angularly projecting end of the section 12 is designed to be arranged in alinement with the condensing tube 3 while the angularly projecting end of the section 11 extends in an opposite direction and by adjusting the sections in a proper relative position the outer end of this tube 11 will be alined and arranged in close relation with the auxiliary objective lens and owing to the mirrors 13 the light will be reflected from the condensing tube through the light reflecting tube and thence through the auxiliary objective lens to consequently display advertising slides. When the tube is arranged in a vertical position the light from the lamp box will be projected through the main objective lens so as to show moving pictures as will be appreciated.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which as a mater of language might be said to fall therebetween.

Having thus fully described this invention, what is claimed as new and desired to be secured by Letters-Patent, is:—

1. The combination with a support, a lamphouse adjustably mounted thereon, a bracket rigidly mounted with respect to the support, a casing carried by the outer end of the bracket and provided with a slot adjacent one end, an auxiliary objective lens mounted in the inner end of the casing, and a light reflecting tube pivotally mounted with respect to the support between the lamphouse and the auxiliary objective lens and adapted to be removably arranged in alinement with the lamphouse and the auxiliary objective lens.

2. The combination with a main support, a lamphouse adjustably mounted thereon, of a rigidly mounted bracket, a casing carried at the outer end of the bracket and provided at its outer end with a slide receiving slot, an auxiliary objective lens mounted at the inner end of the casing, a sectional light conducting tube composed of relatively adjustable L-shaped sections rectangular in cross section, mirrors arranged diagonally within the sections adjacent the outer corners, and means for swingingly supporting the light reflecting tube with respect to the table board whereby the tube may be removably arranged to receive light rays from the lamp box and reflect them through the auxiliary objective lens.

3. The combination with a supporting table, a lamphouse adjustably mounted on the inner end thereof, of an auxiliary objective lens mounted laterally of the table, a light reflecting tube composed of two L-shaped sections rectangular in cross section, means for adjustably connecting the inner ends of the sections so that the angularly projecting outer ends will extend in opposite directions, reflecting plates mounted within the sections and disposed diagonally of the outer corners, standards mounted in spaced relation on the table for swingingly supporting the reflecting tube and manually operable means for swinging the tube to a vertical inactive position or a horizontal operative position so as to consequently reflect light from the lamp box through the objective lens.

4. An attachment for motion picture machines including a light reflecting tube composed of two L-shaped sections rectangular in cross section, the inner ends of the sections being telescopically arranged relative to each other so as to dispose the angularly projecting ends in opposite directions, means for adjusting the sections relative to each other, means for guiding the sliding movement of the sections during adjustment, opposed trunnions projecting from opposite sides of one of the sections, rigidly mounted standards in the upper ends of which the trunnions are journaled, an arm projecting from one of the trunnions, a connecting rod having one end pivotally connected to the outer end of the standards and having its outer end pivotally connected to the opposite end of the connecting rod whereby to swing the light tube from a vertical position to a horizontal position.

In testimony whereof I affix my signature.

WILLIAM H. KELLY.